Figure 1:
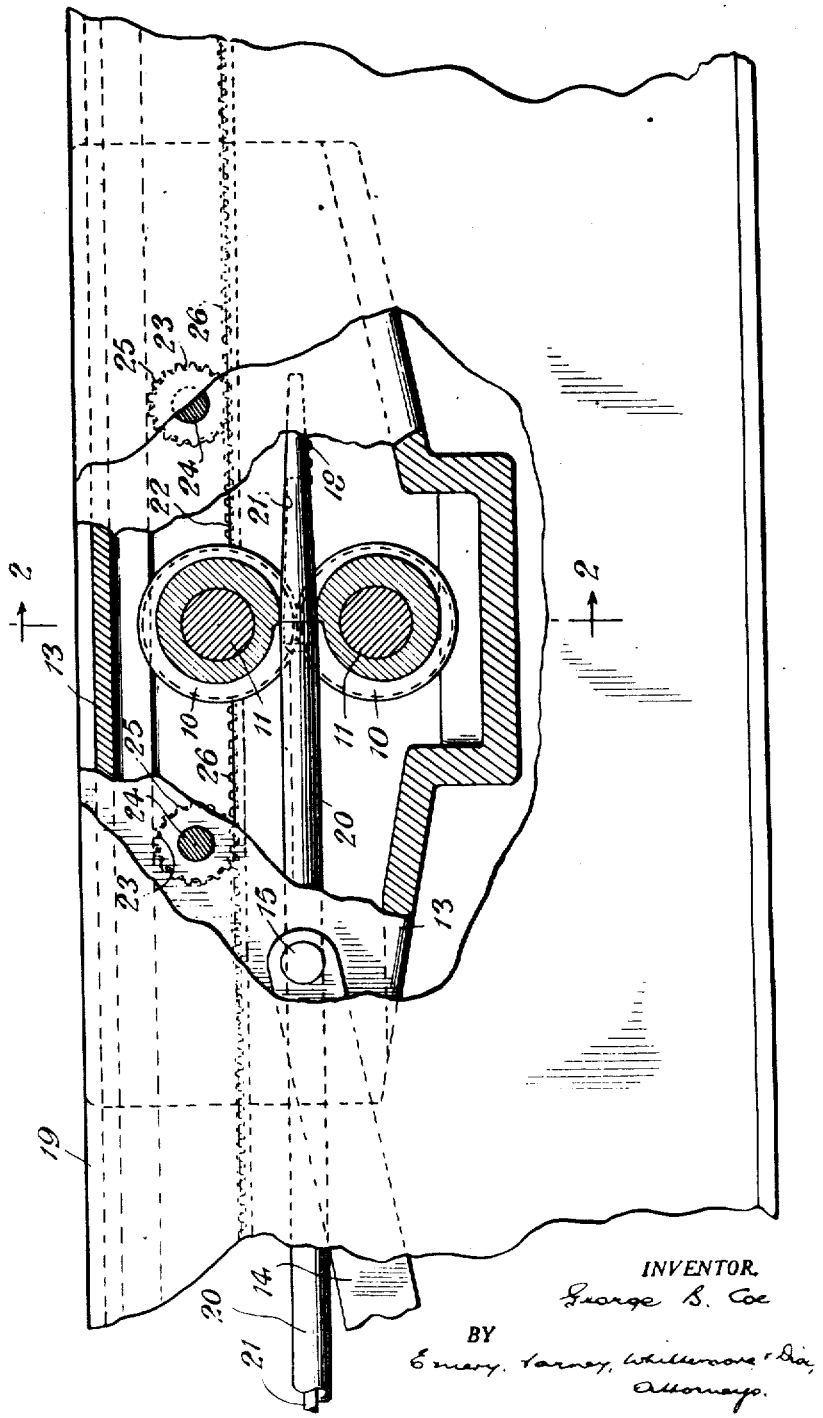

Feb. 17, 1948.　　　G. B. COE　　　2,436,098
TUBE REDUCING MILL
Filed March 16, 1945　　　2 Sheets-Sheet 1

INVENTOR.
George B. Coe

Feb. 17, 1948.  G. B. COE  2,436,098
TUBE REDUCING MILL
Filed March 16, 1945  2 Sheets-Sheet 2

INVENTOR,
George B. Coe
BY
Emery, Varney, Whittemore
Attorney.

Patented Feb. 17, 1948

2,436,098

UNITED STATES PATENT OFFICE 2,436,098

TUBE REDUCING MILL

George B. Coe, Upper Montclair, N. J.

Application March 16, 1945, Serial No. 583,099

2 Claims. (Cl. 80—14)

This invention relates to improvements in tube reducing mills of the type having a reciprocating head or carriage in which the die-rolls or rockers are journaled, one example of such type of mill being shown in the drawings of my copending application filed June 22, 1944, Serial Number 541,491. The present improvements are directed more particularly to the means for supporting the head or carriage in that type of mill with a view to reduce friction and vibration and thereby enable the mill to be operated smoothly at high speeds and to secure other advantages to be pointed out hereinafter.

Figure 2:
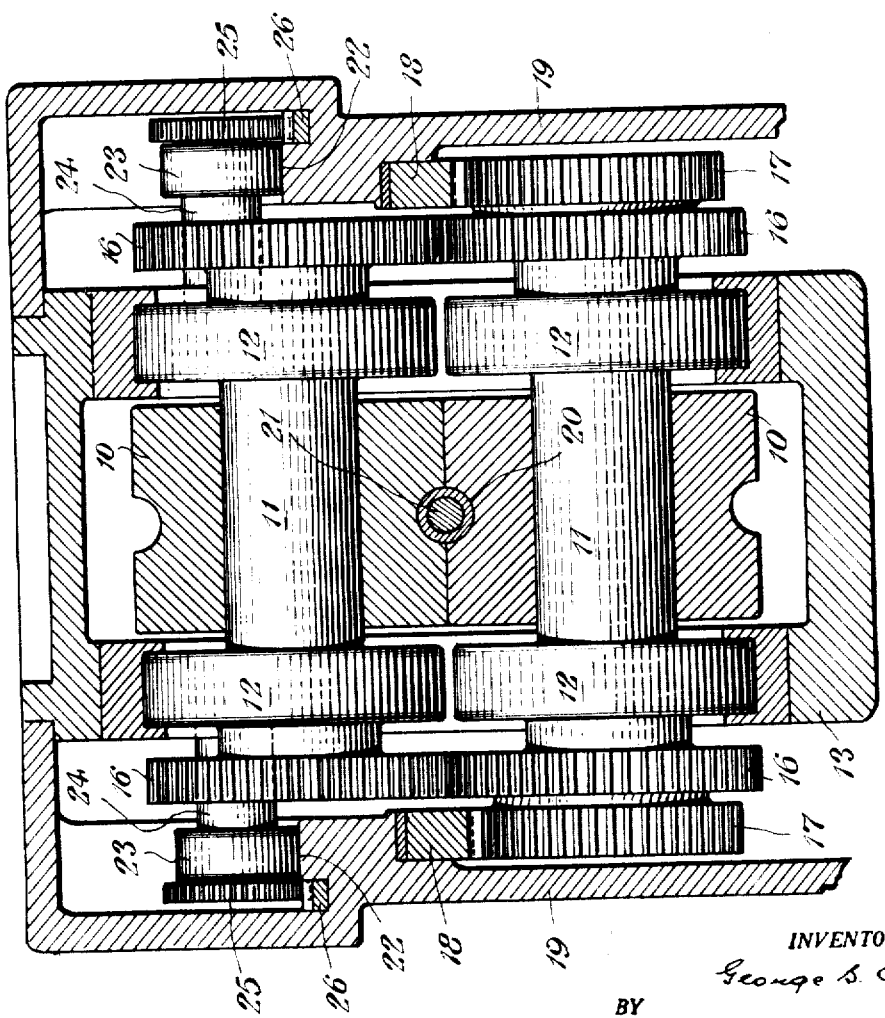

In the drawings,

Fig. 1 is a view in side elevation of the forward end of a tube mill embodying the present improvements, said figure being broken away to show the die-rockers and the connection of the reciprocating means to the carriage; and Fig. 2 is an enlarged sectional view taken on a plane indicated by the line 2—2 in Fig. 1.

The die-rolls or rockers 10 and their shafts 11 to which they are rigidly secured are preferably symmetrically mounted with respect to a vertical line through the center of the carriage 13 on roller bearings 12 in the carriage which is reciprocated by means including, as here shown, arms 14 pivoted, one on each side, to the carriage at 15 and operatively connected to the main driving mechanism (not shown) of the mill. Fast on the respective ends of each die-roll shaft are gears 16 and, on the ends of one of said shafts, gears 17, the gears 16 on the same side of the carriage meshing with each other, and the gears 17 meshing respectively with racks 18 secured, one on each side of the carriage, to the frame 19 of the mill, whereby when the carriage is reciprocated by the arms 14 the die-rolls will be rocked or oscillated. The tubular stock is indicated at 20 and its supporting mandrel at 21. The stock and mandrel, together with the parts of the mill just referred to are shown conventionally since the present improvements are independent of the precise form and relation of those parts.

On each side of the head or carriage 13, the upper part of the frame of the mill is provided with tracks 22 extending along the respective sides of the carriage in a horizontal plane and on or from which the carriage is suspended or hung so that its center of gravity as a whole (that is including the heavy die-rolls) is as near to said horizontal plane as the driving connections of the reciprocating means practicably permit, being supported on said tracks by rollers 23 journaled on heavy studs 24 fast to the carriage fore and aft and on each side thereof so that as the carriage is reciprocated the rollers travel back and forth along said tracks. Secured to each roller so as to rotate therewith is a gear 25, said gears 25 meshing with racks 26 secured on either side of the carriage to the frame 19 so as to extend along the tracks 22, the purpose of the gears 25 and racks 26 being to prevent slippage and consequent wear and flattening of the peripheries of the rollers when the carriage reverses the direction of its movement at the beginning and end of each half-cycle of reciprocation.

The distance between the axes of the fore and aft rollers on each side of the carriage is such as to provide a relatively long supporting base for the carriage, that is to say, relatively long in comparison with the distance of the center of gravity of the carriage from the horizontal plane of the tracks 22, and preferably at least from four to seven times this latter distance. By connecting the arms 14 of the reciprocating means for the carriage at the point 15 on either side of the carriage (each point 15 being approximately the same distance as the center of gravity of the carriage from the horizontal plane of the tracks 22) so that the plane of the applied force which effects the reciprocation of the carriage will be very close to the plane of the tracks 22 in comparison with the length of the roller base of the carriage, the tendency of the carriage to vibrate will be counteracted even when it is reciprocated at high speeds. The elimination of vibration is a very important consideration in any heavily-built mechanism and especially so in tube mills of the present type designed for the cold rolling of metal tubing to within very narrow tolerances of a prescribed size and gage since their efficiency depends to a large extent upon capability of operation at high speeds which, in turn, requires absolute smoothness of operation at all times.

The use of supporting rollers for the die-roll carriage I have found to be of great advantage over the customary bearing-shoes since the rollers provide an almost frictionless bearing with little or no lubricating difficulties such as are encountered with bearing-shoes which, if lubrication fails, burn rapidly owing to the enormous friction which immediately ensues. This is not so with the rollers since they can be safely left to automatic lubrication, whereas bearing-shoes require constant watching despite automatic lubrication. In the mill of my aforesaid patent application, the rollers supporting the die-roll carriage roll along the base of the mill and support the carriage above them. That arrangement I have found to be much less advantageous than the present one where the carriage is suspended on the rollers; for in the present case the rollers and their tracks do not tend to become contaminated with water, dirt and other waste matter which, in the other case, tends to collect upon the rollers and to clog the tracks and thus not only interferes with the proper lubrication of the rollers but prevents the smooth reciprocation of the carriage. Moreover, my present improvements enable the rollers to be readily inspected, lubricated, and given proper care and attention at all times.

I claim as my invention:

1. In a tube reducing mill, the combination with the frame thereof, the die-rolls, a reciprocating carriage in which the die-rolls are symmetrically mounted with respect to a vertical line through the center of the carriage, and means to reciprocate the carriage, of means to suspend the carriage from a horizontal plane above the point where the reciprocating means is secured to the carriage, said last named means comprising tracks on the frame on each side respectively of the carriage and lying in said horizontal plane, supporting rollers journaled on the carriage both fore and aft and on each side thereof and adapted to roll on said tracks, gears secured to the rollers to rotate therewith, and racks secured to the frame on each side of the carriage respectively and lying along the respective tracks in mesh with the respective gears on each side of the carriage, the distance between the axes of the fore and aft supporting rollers being at least four times the distance between said horizontal plane and the point where the reciprocating means is secured to the carriage.

2. The combination set forth in claim 1 and further characterized by this: that the distance between the axes of the fore and aft supporting rollers is approximately seven times the distance between said horizontal plane and the center of gravity of the carriage.

GEORGE B. COE.

REFERENCES CITED

The following references are of record in the file of this patent:

UNITED STATES PATENTS

| Number | Name | Date |
| --- | --- | --- |
| 1,980,186 | Coe | Nov. 13, 1934 |